May 5, 1970
C. H. McCREA
3,510,551
CASTING COMPOSITE ARTICLES
Filed Nov. 20, 1967
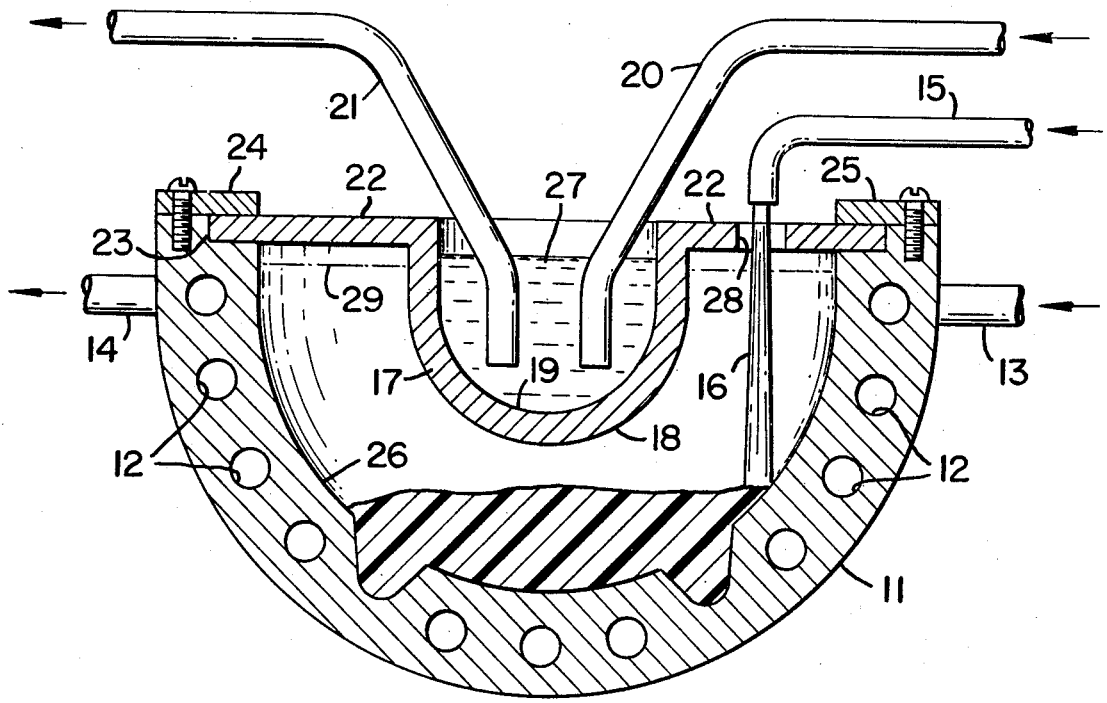
FIG_1
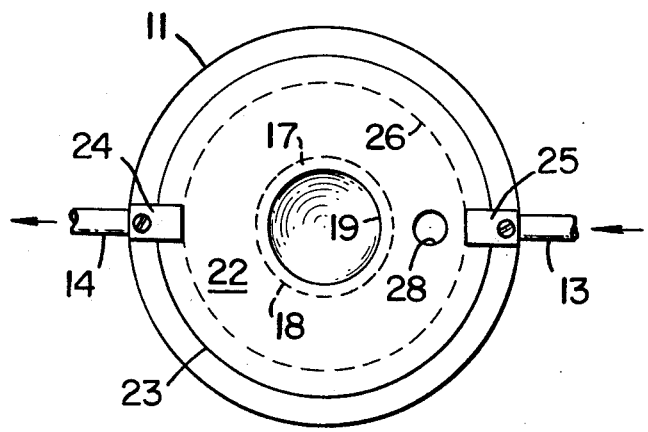
FIG_2
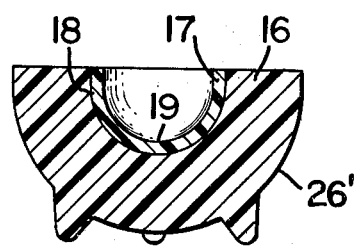
FIG_3
INVENTOR.
CHARLES H. McCREA
BY
*Townsend and Townsend*
ATTORNEYS

United States Patent Office 3,510,551
Patented May 5, 1970

3,510,551
CASTING COMPOSITE ARTICLES
Charles H. McCrea, Belmont, Calif., assignor to Plastic Productions Company, Redwood City, Calif., a corporation of California
Filed Nov. 20, 1967, Ser. No. 684,385
Int. Cl. B29c *6/04;* B29g *7/100;* B32b *31/00*
U.S. Cl. 264—250                                6 Claims

ABSTRACT OF THE DISCLOSURE

A method of casting thick-walled composite articles from a combination of different plastic materials is disclosed wherein a solid thermoplastic material forms a part of the mold for a fluid plastic material and is integrally bonded to the fluid material during hardening.

---

This invention relates to a method of casting different plastic materials to form a thick-walled integral final product.

It is often desirable to provide molded composite articles from different plastic materials. For instance, a container may be formed with relatively thick walls of a thermosetting material and have an inside liner of another plastic material with different color or other physical characteristics. In the past, such composite articles have been held together with an interbonding material which may affect the appearance of the article. Furthermore, the interbonding material may subsequently deteriorate resulting in separation of the materials combined in the article.

Further problems have been encountered in the casting of such articles because of the different physical characteristics of the materials combined in the casting process.

It is an object of the present invention to overcome the problems heretofore encountered and provide a method of casting composite articles without the necessity of an interbonding material. According to this method of casting different plastic materials, a solid thermoplastic material acts as part of the mold for fluid plastic material, and during hardening of the fluid plastic material, the surface of the solid thermoplastic material contiguous with the fluid material is plasticized to form a continuous bond or weld between the materials upon completion of hardening. Thus, the inside portion of a thick-walled cast bowl can in the present invention be formed of a thermoplastic liner of the type which can be conveniently colored in a manner distinctive from the remainder of the body and which can further function as a portion of the mold during the casting process.

A still further object of the invention is to provide a method of casting whereby materials of significantly different color and physical characteristics may be permanently bonded together. Accordingly, the present invention provides a method of casting as set forth above wherein the solid plastic is thermoplastic and the fluid plastic is thermosetting and wherein the outer surface of the thermosetting material is heated to initiate hardening so that during the molding process and upon subsequent shrinkage of the thermosetting material, a hardened skin will function to retain the desired configuration of the article. Furthermore, means are provided to stabilize temperature and prevent rapid curing to thereby avoid cracks or ruptures which may be encountered in thick-walled casting.

In order to accomplish these results, the present invention contemplates the steps of forming an open mold adapted to receive the fluid plastic material, forming a configuration of solid thermoplastic material to be cast with the fluid plastic material and then mounting the solid plastic configuration in the opening of the mold in spaced relation from the mold. The invention also contemplates pouring a fluid plastic material into the common space between the mold and the solid thermoplastic material.

One aspect of my invention contemplates the use of a fluid thermosetting material which enters into an exothermic reaction during hardening so that the heat of curing plasticizes the surface of the thermoplastic material contiguous with the thermosetting material whereby fluid migration between the materials takes place to form a permanent weld. Another aspect of my invention contemplates the use of a solid thermoplastic material and a fluid thermoplastic material having a common solvent to thereby plasticize the solid thermoplastic surface contiguous with the fluid thermoplastic material to form a permanent bond.

Where the fluid material is thermosetting the inner surface of the mold is heated to accelerate hardening of the thermosetting material at its outer portion first.

Furthermore, the invention contemplates cooling the unexposed surface of the solid thermoplastic material which also serves as part of the mold for the fluid plastic to maintain that surface in hardened form. In addition, means are provided for stabilizing the temperature in the mold during hardening to avoid cracks and imperfections, and cooling both the thermoplastic and thermosetting materials to form an integral cast article.

Other objects, features and advantages of the present invention will be more apparent after referring to the following specification and accompanying drawing in which:

In the drawing:

FIG. 1 is a cross-sectional view from the side of one form of apparatus for carrying out the method of casting contemplated by the invention.

FIG. 2 is a partial elevational view from above of the mold illustrated in FIG. 1; and FIG. 3 is a cross-sectional view from the side of a composite article cast according to the method contemplated by the invention.

In the apparatus illustrated in FIG. 1 a mold 11 is provided, with an inner surface complementary in shape to the outer surface of the article to be cast, in this case a thick-walled bowl with legs. Circulating tubes 12 in the mold 11 permit the circulation of a heating or cooling medium supplied through pipes 13 and 14. Positioned over the open mold is a supply means 15 through which a fluid plastic material 16 may be supplied to the mold.

Mounted in the opening of the mold 11 and in spaced relationship from the mold is a configuration of solid thermoplastic material 17 having a first or outer surface 18 and a second or inner surface 19. The shell of thermoplastic material 17 may be suspended from above by tension against the inner surface 19 or as in this case by providing a brim or collar 22 on the thermoplastic material 17 so that it may rest upon mold 11, in the groove 23 and under clamps 24 and 25 to maintain the desired spatial relationship. Pipes 20 and 21 serve to supply a cooling medium 27 such as water to the inside surface 19 of the thermoplastic shell 17. In most cases, circulation of the water is not required as enough cooling effect is supplied by the original water poured into the inside of the thermoplastic material 17.

In casting a composite article using this apparatus, the thermoplastic material 17 will in effect act as part of the mold for the fluid plastic material 16. Thus, the second or inner surface 19 of the thermoplastic material 17 will form part of the surface of the final product and would be shaped accordingly. The first or outer surface 18 will be contiguous with the fluid plastic material.

After positioning the shell of thermoplastic material 17 in the opening of the mold, a fluid plastic material 16 in liquid form is poured into the mold through a hole 28 in the collar 22 to the appropriate level 29. Alternatively, the liquid plastic may first be poured in the mold and the solid thermoplastic shell 17 then positioned in the mold, displacing the liquid upward to the appropriate level.

If the fluid plastic is thermosetting, a heating medium supplied via pipes 13 and 14 and channels 12 heats the inner surface 26 of mold 11 to accelerate hardening or polymerization of the thermosetting material at its outer portion 26' to form a hardened skin. The thermosetting material is selected to be exothermic during hardening so that the heat of curing will further augment hardening of the material in the mold. The hardened skin at the outer portion 26' of the thermosetting material serves to retain and preserve the desired shape during any shrinkage. During the exothermic reaction of hardening, the medium flowing in pipes 13 and 14 and channels 12 then serves as a cooling medium to stabilize the temperature and prevent cracking or deformation which may occur in thick-walled casting from too rapid curing.

During hardening of a fluid thermosetting material, the heat of curing will plasticize the first or outer surface 18 of the thermoplastic material 17 to permit fluid migration between the thermoplastic and thermosetting materials. Upon subsequent hardening, a strong, permanent and continuous bond or weld will therefore be formed between the two materials. The thermosetting and thermoplastic materials may be advantageously selected to have a common solvent to further aid in plasticizing the outer surface 18 of the thermoplastic material 17 during hardening of the thermosetting material 16.

At the same time as the outer surface 18 of the thermoplastic material 17 is softening under the influence of the heat and solvent from a fluid thermosetting material, a cool material such as water 24 is supplied by pipes 20 and 21 to the inner surface 19 of the thermoplastic material 17 to maintain a hard surface, and thereby retain the configuration of the final article.

After the thermosetting material has hardened and the heat of curing dissipated, the composite article may be appropriately finished wtih results as illustrated in FIG. 3.

In another form of the invention, the fluid plastic material may be a liquid thermoplastic material. In this form of the invention the liquid thermoplastic is chosen to have a common solvent with the solid thermoplastic configuration 17. A cooling medium supplied to the mold via pipes 13 and 14 and channels 12 would initiate hardening of the liquid thermoplastic at its outer portion. The common solvent would plasticize the first or outer surface 18 of the solid thermoplastic shell 17 to form a common bond or weld upon completion of hardening. In other respects, the method would be the same.

For a liquid thermosetting material, a casting resin such as a styrene monomer polyester may be used which undergoes an exothermic reaction during hardening and is thermally autocatalytic. The heat of curing thereby plasticizes the outer surface 18 of the thermoplastic material 17 with which it is in contact. For the solid thermoplastic material, a plastic such as an acrylic polymer may be used. The thermoplastic material may be tinted or colored to form an aesthetic composite product. If the liquid material is chosen to be thermoplastic, a material such as an acrylic polyester or epoxy resin may be used. In the method of casting described above, a thick-walled composite article such as the bowl or container may be molded without distortion and with retention of shape and with strong continuous and permanent bonding between the different plastic materials combined to form the integral cast product.

I claim:

1. A method of casting composite articles comprising: forming an open mold adapted to contain the material to be molded and having an inner surface complementary in shape to part of the surface of the article to be cast; forming a configuration of solid thermoplastic material having a first surface and a second surface and shaping the second surface to form a part of the surface of the article to be cast; mounting the solid thermoplastic material in the opening of the mold and in spaced relation from the mold thereby forming a common space between the inner surface of the mold and the first surface of the thermoplastic material; pouring a liquid exothermic thermosetting material in the space between the inner surface of the mold and the first surface of the thermoplastic material and in contact with both; heating the inner surface of the mold to accelerate hardening of the thermosetting material at the inner surface of the mold whereby a hardened outer shell is formed to preserve the configuration of the article during subsequent shrinkage and to cause the heat of curing generated by the exothermic reaction to plasticize the first surface of the thermoplastic material permitting fluid migration between the thermoplastic and thermosetting materials; cooling the second surface of the thermoplastic material to maintain the second surface in hardened form; stabilizing the temperature in the mold during completion of setting of the thermosetting material to prevent cracking or deformation; and cooling both the thermoplastic and thermosetting materials to form an integrally welded cast composite article.

2. A method of casting composite articles comprising: forming an open female mold adapted to receive the material to be molded and having an inner surface complementary in shape to the outer surface of the article to be cast; forming a shell of thermoplastic material having an inner surface and an outer surface, said inner surface forming the inner surface of the article to be cast; mounting the thermoplastic shell in the opening female mold in spaced relation therefrom thereby forming a common space between the inner surface of the mold and the outer surface of the thermoplastic shell; pouring a liquid exothermic thermosetting material into the common space between the inner surface of the mold and the outer surface of the thermoplastic shell; heating the inner surface of the mold to initiate hardening of the thermosetting material at the inner surface of the mold and to accelerate an exothermic reaction to cause the heat and solvent released by the thermosetting material to plasticize the outer surface of the thermoplastic shell permitting fluid migration between the thermoplastic and thermosetting materials; cooling the inner surface of the thermoplastic shell to maintain the inner surface in hardened form; stabilizing the temperature of the mold during completion of the hardening of the thermosetting material to prevent cracking or deformation from too rapid curing; and finally cooling the thermoplastic and thermosetting materials to form an integrally bonded cast composite article.

3. A method of casting composite articles comprising: providing an open mold adapted to contain the material to be molded and having an inner surface complementary in shape to part of the surface of the article to be cast; providing a configuration of solid thermoplastic material having a first surface and a second surface with the second surface shaped to form a part of the surface of the article to be cast; pouring a liquid exothermic thermosetting material in the open mold; mounting the solid thermoplastic material in the opening of the mold and in spaced relation from the mold so that the first surface of the solid thermoplastic material is in contact with the liquid thermosetting material; heating the inner surface of the mold to accelerate hardening of the thermosetting material at the inner surface of the mold whereby a hardened outer shell is formed to preserve the configuration of the article during subsequent shrinkage and to cause the heat of curing generated by the exothermic reaction to plasticize the first surface of the thermoplastic material permitting fluid migration between the thermoplastic and thermosetting materials; cooling the second surface of the thermoplastic material to maintain the second surface in hardened form; stabilizing the temperature in the mold during completion of setting of the thermosetting material to prevent cracking or deformation; and cooling both the thermoplastic and thermosetting materials to form an integrally welded cast composite article.

4. A method of casting composite articles as set forth in claim 3 wherein the liquid thermosetting material is a styrene monomer polyester.

5. A method of casting composite articles as set forth in claim 3 wherein the solid thermoplastic material is an acrylic polymer.

6. A method of casting composite articles as set forth in claim 3 wherein the thermosetting material and the thermoplastic material have a common solvent.

References Cited
UNITED STATES PATENTS

| | | | |
|---|---|---|---|
| 2,242,117 | 5/1941 | English et al. | 264—327 X |
| 2,492,973 | 1/1950 | Dofsen et al. | 264—135 |
| 3,040,384 | 6/1962 | Whittington | 264—275 X |
| 3,247,550 | 4/1966 | Haines | 264—275 X |
| 3,320,344 | 5/1967 | Slipp | 264—246 X |

ROBERT E. WHITE, Primary Examiner

KENNETH J. HOVET, Assistant Examiner

U.S. Cl. X.R.

264—275, 327, 279